3 Sheets—Sheet 1.

C. A FREEMAN.

FLUE LINING AND DIES FOR FORMING THE SAME FROM CLAY.

No. 9,851. Reissued Aug. 30, 1881.

Witnesses.
F K Fitler
T G Hayes

Inventor.
Charles A Freeman
by James L. Kay
Attorney

N. PETERS, Photo-Lithographer, Washington, D. C.

3 Sheets—Sheet 2.

C. A FREEMAN.

FLUE LINING AND DIES FOR FORMING THE SAME FROM CLAY.

No. 9,851. Reissued Aug. 30, 1881.

Witnesses:
F. K. Fitler
F. G. Kay

Inventor:
Charles A. Freeman
by James T. Kay
Attorney

N. PETERS, Photo-Lithographer, Washington, D. C.

3 Sheets—Sheet 3.

C. A FREEMAN.

FLUE LINING AND DIES FOR FORMING THE SAME FROM CLAY.

No. 9,851. Reissued Aug. 30, 1881.

—Witnesses.—

F K Fitler

T. G. Hay

— Inventor. —

Charles A. Freeman by James L. Hay

Attorney

N. PETERS, Photo-Lithographer, Washington, D. C.

UNITED STATES PATENT OFFICE

CHARLES A. FREEMAN, OF NEW CUMBERLAND, WEST VIRGINIA.

FLUE-LINING AND DIE FOR FORMING THE SAME FROM CLAY.

SPECIFICATION forming part of Reissued Letters Patent No. 9,851, dated August 30, 1881.

Original No. 170,841, dated December 7, 1875. Application for reissue filed August 3, 1881.

*To all whom it may concern:*

Be it known that I, CHARLES A. FREEMAN, of New Cumberland, in the county of Hancock and State of West Virginia, have invented certain new and useful Improvements in Flue-Linings and Dies for Forming the Same from Clay; and I do hereby declare that the following is a full, clear, and exact description thereof, reference being had to the accompanying drawings, which form a part of this specification, in which—

Figure 1:
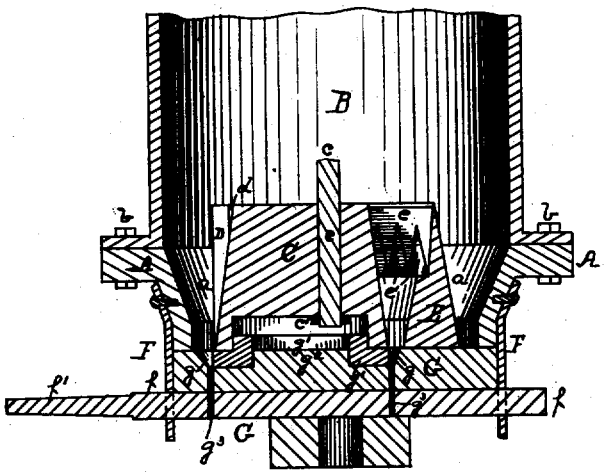
Figure 2:
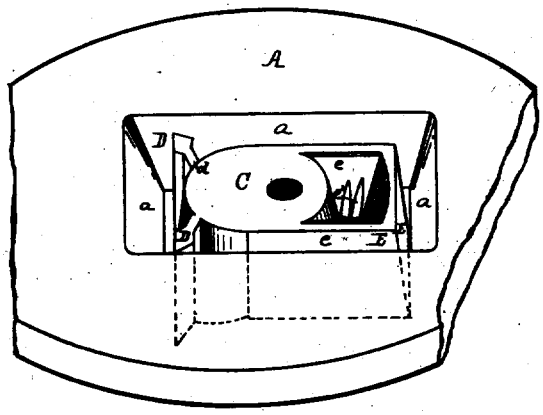
Figure 3:
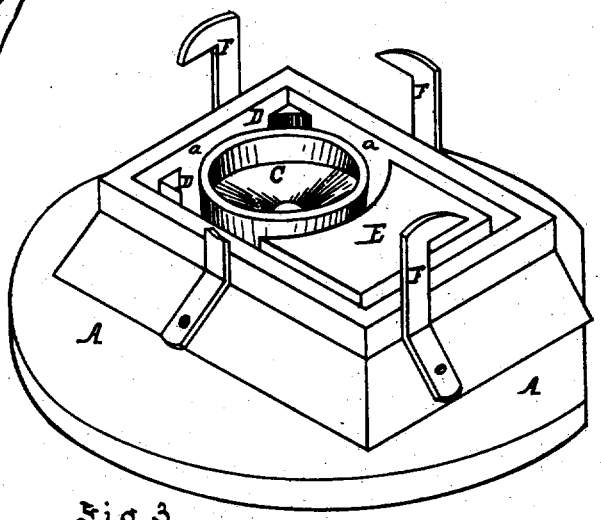
Figure 4:
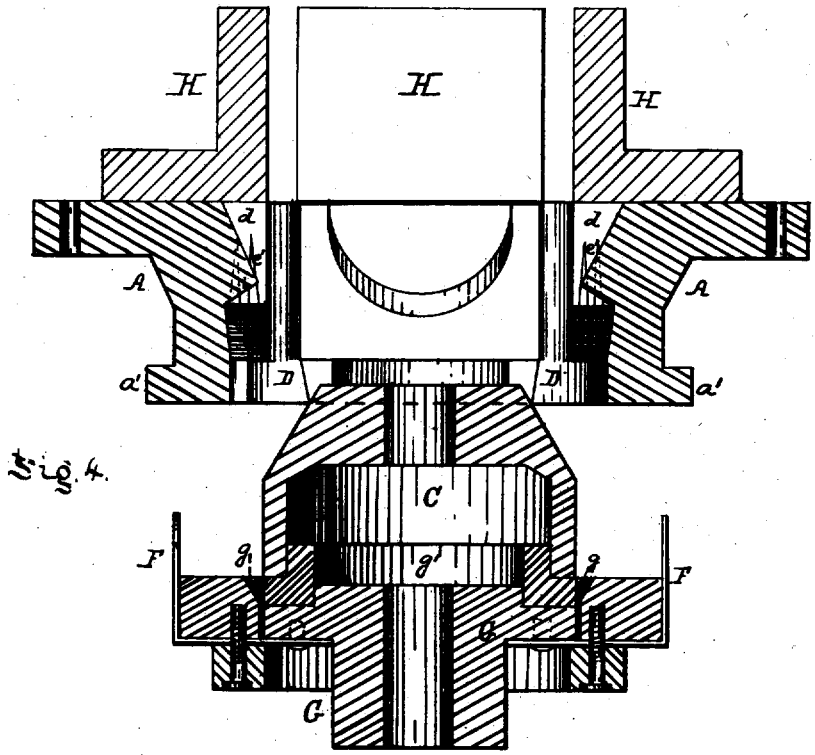
Figure 5:
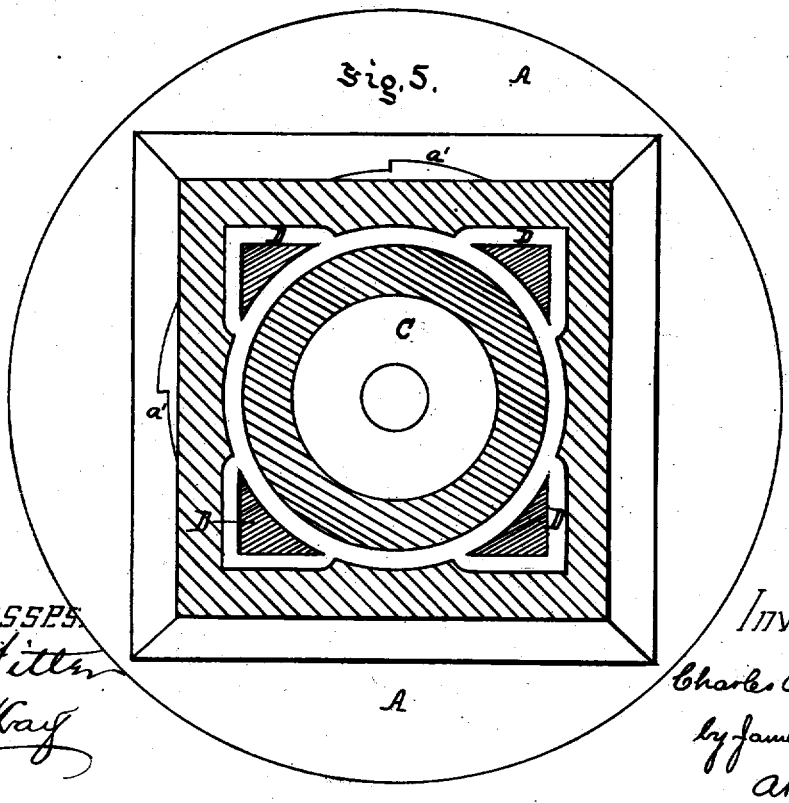
Figure 7:
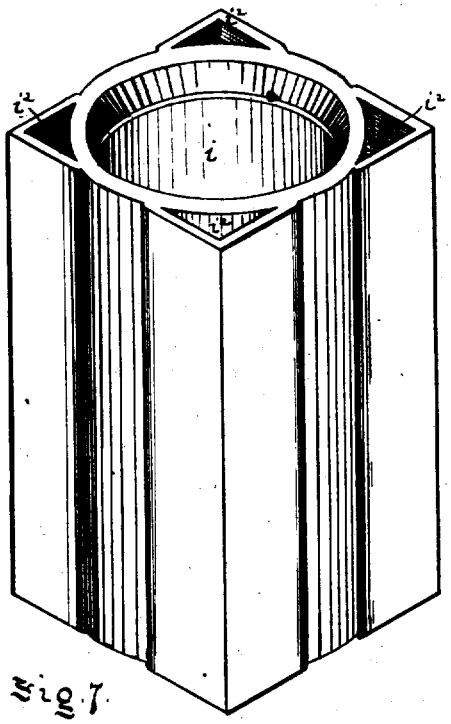
Figure 6:
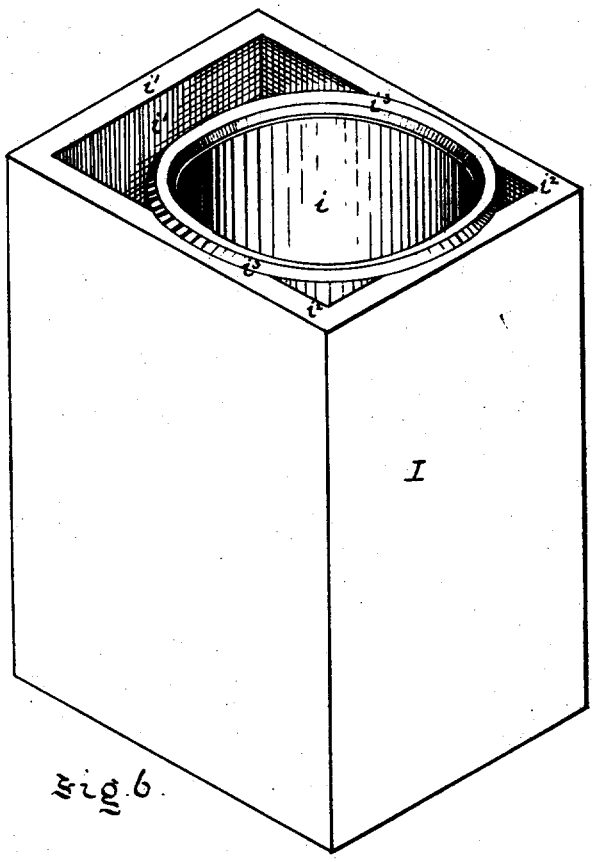

Figure 1 is a sectional view of the die for forming the pipe, attached to the clay-cylinder. Fig. 2 is a top perspective view of the die. Fig. 3 is a bottom perspective view of the die, the pipe-rest being removed. Fig. 4 is a sectional view of a modification of the form of die for producing flue-lining of square section. Fig. 5 is a bottom view of the same, the under surface being hatched. Figs. 6 and 7 are views of different shapes of flue-lining and ventilating-pipe.

Like letters of reference indicate like parts in each.

My invention relates to flue-linings, ventilating-pipe, sewer-pipe, &c., and their manufacture; and it consists, first, in a die for forming flue-linings having two or more parallel passages, said die being provided with two or more cores, arranged within the die in such manner that the spaces intervening between the cores and the cores and die shall correspond to the web or walls of the article to be produced; second, in a flue-lining or similar pipe rectangular in cross-section and having two or more parallel passages within the flue-lining; and, third, in a terra-cotta flue-lining or similar pipe square in cross-section, and having a cylindrical central passage and wing-passages between said central passage and the corners of the pipe.

To enable others skilled in the art to make and use my invention, I will proceed to describe it more fully.

The die or cylinder-head A is attached to the clay-cylinder B by means of the bolts *b*. In the inner part of the cylinder-head is the mold *a*, for forming the outer surface of the pipe. This mold or form *a* may be rectangular, as shown in Figs. 2 and 3, or it may be round or fluted, and will correspond in form to the outline of the article to be produced. Inside of the form *a*, I suspend the central core, C, by means of the rod *c*, passing through the core and fastened by the nut *c'*. Rigidly attached to the core C are two or more lugs, *d*, which carry the triangular wing-cores D. Upon the other side of the core C are the lugs *e*, to which is attached the side core, E. The lower parts of these lugs *d* and *e* are fluted or corrugated at *e'* and thinned down to an edge, for the purpose of causing the fire-clay to reunite more readily after passing the lugs. The faces of the mold *a* and the different cores incline slightly from the top of the die to the bottom, so that the clay, when it passes through the die, is compressed and made more compact. The pipe-rest G is attached to the cylinder-head A by means of the swinging clutches F, which catch on the arms *f* of the pipe-rest, though it is evident that any suitable device may be used for accomplishing the same result—as, for instance, the clutches may be rigidly attached to the cylinder-head A and the arms *f* pivoted to the upper portion of the pipe-rest G, so as to be turned clear of the clutches F by means of the handle *f'*. This pipe-rest G is arranged so that it moves perpendicularly under the cylinder-head A, and can be raised and attached thereto or lowered therefrom when necessary. In this pipe-rest G, I make the circular or cylindrical recess *g*, for forming the projection $i^3$ on the pipe or flue. The outer surface of said recess is beveled, so as to form the bevel on the projection $i^3$, to enable it to fit more easily into the next adjoining pipe. The inner surface of the bevel is formed by the ring *g'*, which is the same size and form as the lower face of the central core, C. This ring *g'* may either fit upon the projection $g^2$, as shown in the drawings, or it may be firmly attached to the rest G, forming part of the same. Through the rest G, I make small openings $g^3$, by means of which I am enabled to determine from the extrusion of the clay that the recess *g* is filled before the pipe-rest is detached from the cylinder-head.

In Figs. 4 and 5 is represented a modification of the form of the die for producing my improved flue-pipe of square section. In it the wing-cores D are attached to and supported by the cylinder-head A by means of the lugs *d*, and the pipe-rest G is attached to the cylinder-head A by means of the clutches F, rigidly attached to the rest G, and catching on the lugs $a'$ on the cylinder-head. The uprights H deflect the clay into the openings around the wing-cores D. In Fig. 4 the central core, C, has been lowered below the die, that the form of the die may be more easily seen.

It is evident that both the wing-cores and side cores (shown in Fig. 1) could be attached to the cylinder-head in the manner above described, as also the central core; but I prefer the form shown in the drawings.

It is also evident that by changing the form of the cores pipes having two or more rectangular or other shaped parallel passages could be formed, and that by substituting a projecting ring on the pipe-rest instead of $g'$ a recess corresponding to the projection on the pipe may be formed. This is simply the reverse of the construction described, and is within the province of a mechanic.

The operation of my improved die is as follows: The pipe-rest G is attached to the cylinder-head A, and the clay is forced down by the piston in the cylinder until the clay passes through the openings $g^3$. The pipe-rest is then detached from the cylinder-head and gradually lowered, while the clay is forced through the die by the piston in the cylinder, the central core, C, forming the central or smoke passage, $i$, in the flue or pipe I, Fig. 6, the side core, E, forming the side or ventilating passage, $i'$, and the wing-cores D forming the passages $i^2$. The web or walls of the article produced correspond to the spaces intervening between the several cores and the die, as will be seen by reference to Fig. 3, so that whatever be the shape of the spaces between them such will be the shape of the pipe manufactured. The recess $g$ in the pipe-rest G forms the projection or flange $i^3$, which fits into the corresponding recess in the next pipe. When the pipe is the desired length it is cut off underneath the die, the pipe carried away, the pipe-rest G again attached to the cylinder-head, and the process continued.

Fig. 6 represents one form of combined smoke, hot-air, and ventilating pipe, the cylindrical passage $i$ being for smoke, the side passage, $i'$, for hot air or ventilation, and the passages $i^2$ $i^2$ in the corners to lighten the weight of the pipe, make the walls of more even thickness, and make the pipe less liable to crack or break from heat, though the passages may be utilized for some other purpose. The projection or flange $i^3$ is only made upon the central passage, the edges of the rest of the flue being square and fitting close to each other.

Fig. 7 represents my improved pipe formed in the die shown in Figs. 4 and 5, the cylindrical central passage being for smoke or ventilating purposes, and the wing-passages in the corners around it being to lighten the walls which impart to the pipe the square exterior.

It is evident that by forming the central flue cylindrical I obtain the best construction to withstand without breaking the expansion and contraction incident to the use of the pipe, and by forming it square in cross-section I obtain the proper shape to fit or be built into the walls of buildings, the pipe thus formed being found by experience the most desirable for single smoke or ventilating flues.

Having thus described my invention, what I claim, and desire to secure by Letters Patent, is—

1. A die for forming flue or similar pipe, provided with two or more cores, arranged within said die in such manner that the spaces intervening between the several cores and the die shall correspond to the web or walls of the article to be produced, substantially as described.

2. In a die for forming flue or similar pipe, the combination of the cylinder-head, central core, and one or more side or wing cores, substantially as and for the purposes set forth.

3. As a new article of manufacture, a terra-cotta flue-lining or similar pipe square in cross-section, and having a cylindrical central passage and wing-passages between said central passage and the corners of the pipe, substantially as and for the purposes set forth.

In testimony that I claim the foregoing I have hereunto set my hand this 18th day of July, 1881.

CHARLES A. FREEMAN.

Witnesses:
J. H. ATKINSON,
B. J. SMITH.